US012131032B1

(12) United States Patent
Rosenbaum et al.

(10) Patent No.: US 12,131,032 B1
(45) Date of Patent: Oct. 29, 2024

(54) DISPATCHER FOR IMPROVED-PERFORMANCE NON-VOLATILE MEMORY STORE OPERATIONS

(71) Applicant: Apple Inc., Cupertino, CA (US)

(72) Inventors: Li Rosenbaum, Rishon Lezion (IL); Elad Harush, Raanana (IL); Omri Flint, Ramat Hasharon (IL)

(73) Assignee: APPLE INC., Cupertino, CA (US)

( * ) Notice: Subject to any disclaimer, the term of this patent is extended or adjusted under 35 U.S.C. 154(b) by 72 days.

(21) Appl. No.: 17/987,899

(22) Filed: Nov. 16, 2022

Related U.S. Application Data

(60) Provisional application No. 63/407,676, filed on Sep. 18, 2022.

(51) Int. Cl.
    *G06F 3/06*     (2006.01)
(52) U.S. Cl.
    CPC .......... *G06F 3/0616* (2013.01); *G06F 3/0611* (2013.01); *G06F 3/0659* (2013.01); *G06F 3/0679* (2013.01); *G06F 3/0689* (2013.01); *G06F 2212/7207* (2013.01)
(58) Field of Classification Search
    CPC .... G06F 3/0616; G06F 3/0611; G06F 3/0659; G06F 3/0679; G06F 3/0689; G06F 2212/7207
    See application file for complete search history.

(56) References Cited

U.S. PATENT DOCUMENTS

| 7,788,427 | B1 | 8/2010 | Yang | |
|---|---|---|---|---|
| 11,216,207 | B2 | 1/2022 | Li | |
| 2007/0113233 | A1* | 5/2007 | Collard | G06F 9/52 718/101 |
| 2013/0097369 | A1* | 4/2013 | Talagala | G06F 12/0804 711/103 |
| 2019/0347191 | A1* | 11/2019 | Hetzler | G06F 3/0679 |
| 2021/0279004 | A1 | 9/2021 | Lin et al. | |
| 2021/0311662 | A1* | 10/2021 | Kotzur | G06F 3/0659 |

OTHER PUBLICATIONS

Wikipedia, "Internet of Things," pp. 1-52, update Sep. 8, 2022.

* cited by examiner

*Primary Examiner* — Kalpit Parikh
(74) *Attorney, Agent, or Firm* — MEITAR PATENTS LTD.

(57) ABSTRACT

A System on Chip (SoC) includes a processor, a parity generation circuit, and a dispatcher circuit. The processor is configured to produce store instructions for storing data blocks in a Non-Volatile-Memory (NVM). The parity generation circuit is configured to calculate parity blocks over the data blocks in accordance with a redundant storage scheme, to send the parity blocks to the NVM, and to produce completion notifications with respect to the parity blocks. The dispatcher circuit is configured to dispatch the store instructions to the NVM. The processor is further configured to send one or more parity-barrier instructions that specify synchronization barriers over the store instructions and the parity, and the dispatcher circuit is configured to dispatch the store instructions to the NVM in compliance with the parity-barrier instructions and the completion notifications.

14 Claims, 7 Drawing Sheets

DISPATCHER FOR IMPROVED-PERFORMANCE NON-VOLATILE MEMORY STORE OPERATIONS

CROSS-REFERENCE TO RELATED APPLICATIONS

This application claims the benefit of U.S. Provisional Patent Application 63/407,676, filed Sep. 18, 2022, whose disclosure is incorporated herein by reference.

FIELD OF THE DISCLOSURE

The present disclosure relates generally to integrated circuits, and specifically to circuits and methods for efficient programming of Non-Volatile Memory (NVM) devices.

BACKGROUND OF THE DISCLOSURE

Today's integrated circuits often comprise circuitry to interface with an external non-volatile memory (NVM) subsystem, such as Solid-State Disk (SSD) or Flash-storage.

For example, U.S. Patent Application Publication 2021/0279004 discloses an SSD control system comprising a first control system including a first control device, and comprising a second control system including a second control device. The first control system is coupled to a first SSD group comprising a plurality of first SSDs, and the second control system is coupled to a second SSD group comprising a plurality of second SSDs. The first control device comprises: a first processing circuit, configured to control a first portion of the first SSDs; and a second processing circuit, configured to control a second portion of the first SSDs. The second control device comprises: a first signal repeating device, configured to respectively receive first, second control signals from the first, second processing circuit to control a first, second portion of the second SSDs.

For another example, U.S. Pat. No. 7,788,427 discloses method and circuit for coupling a disk drive to a host. The circuit includes a Flash memory interface having interface signal lines in communication with the interface controller and the host, a buffer memory to store data received from the host and from the disk drive, a Flash controller to emulate data transfer protocols of the disk drive using the interface signal lines over the Flash memory interface, and a memory wrapper in communication with the interface controller and a buffer manager where the memory wrapper controls the buffering memory according to data transfer rates of the host and the disk drive.

Lastly, U.S. Pat. No. 11,216,207 discloses a method for programming data of page groups into Flash units to include steps for: obtaining, by a host interface (I/F) controller, user data of a page group from a host side, wherein the page group comprises multiple pages; storing, by the host I/F controller, the user data on the pages in a random access memory (RAM) through a bus architecture, outputting the user data on the pages to an engine via an I/F, and enabling the engine to calculate a parity of the page group according to the user data on the pages; obtaining, by a direct memory access (DMA) controller, the parity of the page group from the engine and storing the parity of the page group in the RAM through the bus architecture; and obtaining, by a Flash I/F controller, the user data on the pages and the parity of the page group from the RAM through the bus architecture, and programming the user data on the pages and the parity of the page group into a Flash module.

The present disclosure will be more fully understood from the following detailed description of the embodiments thereof, taken together with the drawings in which:

SUMMARY OF THE DISCLOSURE

An embodiment that is described herein provides a System on Chip (SoC) including a processor, a parity generation circuit, and a dispatcher circuit. The processor is configured to produce store instructions for storing data blocks in a Non-Volatile-Memory (NVM). The parity generation circuit is configured to calculate parity blocks over the data blocks in accordance with a redundant storage scheme, to send the parity blocks to the NVM, and to produce completion notifications with respect to the parity blocks. The dispatcher circuit is configured to dispatch the store instructions to the NVM. The processor is further configured to send one or more parity-barrier instructions that specify synchronization barriers over the store instructions and the parity, and the dispatcher circuit is configured to dispatch the store instructions to the NVM in compliance with the parity-barrier instructions and the completion notifications.

In some embodiments, at least one of the parity-barrier instructions is a parity-calculation-completed barrier instruction for a data block, at least one of the completion notifications is a parity-calculation-completed completion notification, which indicates that calculation of a parity block associated with the data block is completed, and the dispatcher circuit is configured to send the data block to the NVM only after receiving the parity-calculation-completed completion notification.

In some embodiments, at least one of the parity-barrier instructions is a parity-sending-completed barrier instruction for a data block, at least one of the completion notifications is a parity-sending-completed completion notification, which indicates that both calculation and sending of a parity block associated with the data block are completed, and the dispatcher circuit is configured to send the data block to the NVM only after receiving the parity-sending-completed completion notification.

In some embodiments, at least one of the parity-barrier instructions is a timeout-barrier instruction for a data block, at least one of the completion notifications is a timeout-expired completion notification, which indicates that a time that elapsed since the dispatcher has most-recently sent a store instruction exceeds a specified limit, and the dispatcher circuit is configured to send the data block to the NVM only after receiving the parity-calculation-completed completion notification.

In some embodiments, at least one of the parity-barrier instructions is a software-release-barrier instruction for a data block, and the dispatcher circuit is configured to send the data block to the NVM only after receiving barrier-release instruction from the processor.

In some embodiments, the dispatcher circuit includes a queue for storing pending store instructions. In an embodiment, the SOC further includes a memory configured to store the data blocks and the memory blocks that are pending for storage in the NVM. In an embodiment, the SOC further includes a data routing circuit, configured to route the data blocks and the parity blocks among the memory, the parity generation circuit and the NVM.

There is additionally provided, in accordance with an embodiment described herein, a method including producing, in a processor, store instructions for storing data blocks in a Non-Volatile-Memory (NVM). Using a parity generation circuit, parity blocks are calculated over the data blocks in accordance with a redundant storage scheme, the parity blocks are sent to the NVM, and completion notifications are produced with respect to the parity blocks. Using a dispatcher circuit, the store instructions are dispatched to the NVM. The method further includes (i) sending from the processor one or more parity-barrier instructions that specify synchronization barriers over the store instructions and the parity, and (ii) dispatching the store instructions from the dispatcher to the NVM in compliance with the parity-barrier instructions and the completion notifications.

DETAILED DESCRIPTION OF EMBODIMENTS

Overview

Figure 1:
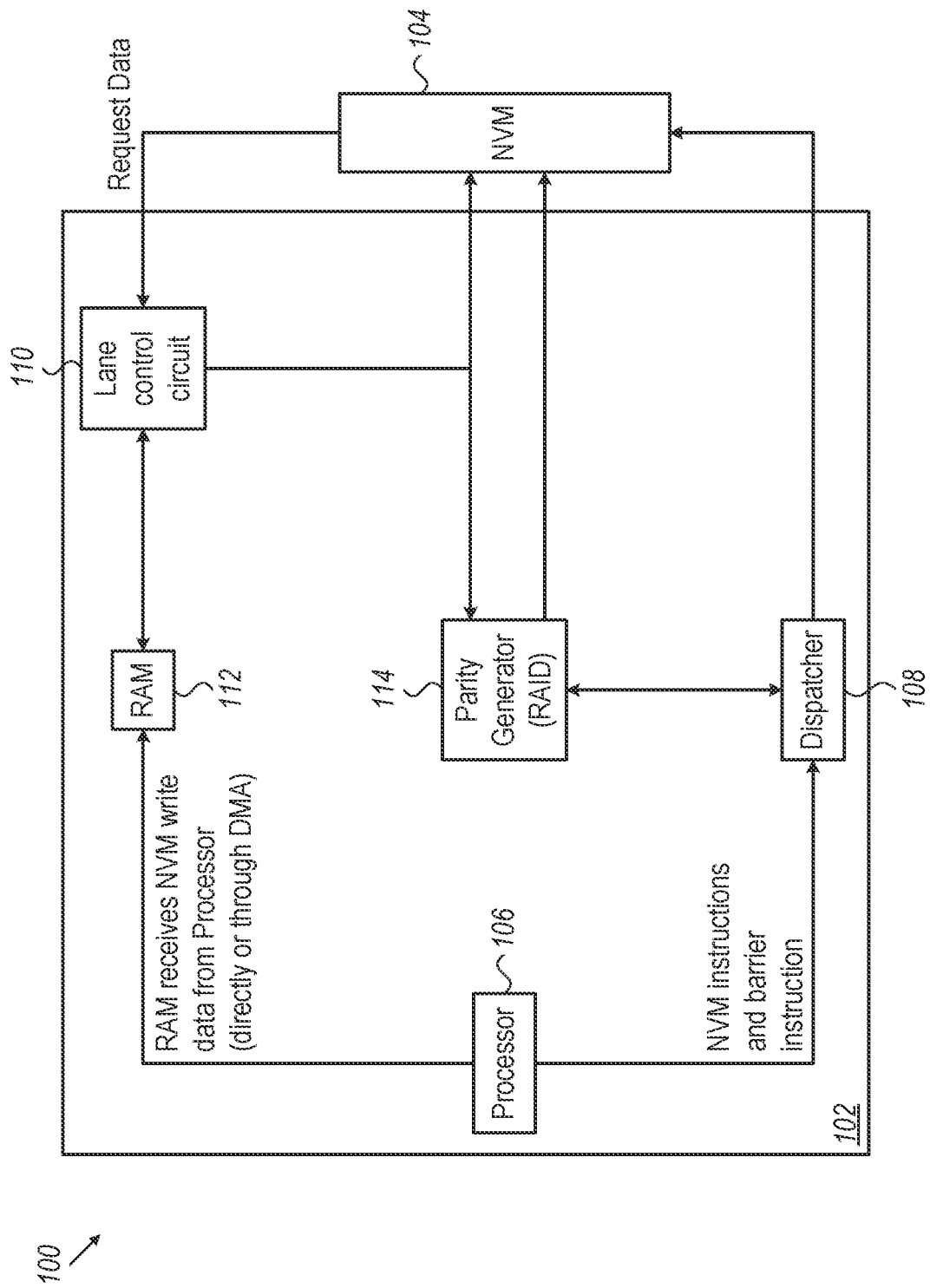
FIG. 1 is a block diagram that schematically illustrates a System including a System on Silicon (SOC) coupled to an NVM Subsystem, in accordance with an embodiment that is described herein.

NVM (e.g., Flash) drives typically include multiple NVM (e.g., Flash) integrated circuits ("dies") in a single package, which also includes a controller integrated circuit. Stored data is often divided between separate dies; for example, each die may store a different bit of each storage byte.

Due to the large amount of stored data and to aging phenomena of the NVM technology, data is often protected by the addition of parity bits, to detect (e.g., using Cyclic Redundancy Code—CRC) and to correct (e.g., using Error Correction Code—ECC) failing storage bits.

The calculation of the parity bits is sometimes done by a parity generation circuit, such as Redundant Array of Independent Discs (RAID) circuit (the term RAID originally referred to rotating storage disks but is also applicable to NVM storage; we will use below the terms "RAID" for parity generation circuit; the terms RAID and "redundant storage scheme" are also used interchangeably herein and refer to any storage scheme in which data is protected by parity bits).

For better performance, blocks of data to be stored may be sent to the NVM drive and to the RAID at the same time; after each block is sent, the RAID may send the corresponding parity data to the NVM; for further performance improvement, more than one block programing tasks may be active at the same time (since the programming (and erase) time for different dies may differ, block programing tasks may not finish at the same time).

The concurrent parity calculation of multiple data blocks may degrade the performance; for example, a RAID often includes a cache memory that stores frequently accessed memory locations; when multiple memory store operations are in progress, cache thrashing may occur, as the cache size is limited.

Embodiments according to the present disclosure present methods and circuits to allow temporal separation of memory store operations according to a status of the RAID. In some embodiments, a processor is configured to send NVM store instructions and intertwined barrier instructions, which separate NVM Store operations, to mitigate congestion and cache thrashing.

In an embodiment, an SOC is coupled to an NVM subsystem (such as an SSD or a Flash drive; referred to hereinbelow as Flash or NVM). The SOC includes a processor, a Parity Generation circuit (RAID), a Random Access Memory (RAM), a Lane Control Circuit and a Dispatcher. The processor sends NVM Store instructions and barrier instructions to the Dispatcher, wherein the barrier instruction specify barrier release events, such as the completion of a parity calculation by the RAID.

The Dispatcher sends store instructions to the NVM, wherein each NVM Store instruction includes a unique ID; The NVM, in response, requests the Lane Control circuit to fetch the data to be stored. The Lane Control unit fetches the data from the RAM and sends the fetched data to the NVM for storage and to the RAID for parity calculation. The Dispatcher, when receiving a NVM Store instruction that follows a barrier instruction, waits for the barrier release event before sending the NVM store instruction to the NVM.

In a disclosed embodiment, the Dispatcher includes a Dispatch Circuit and an Event List. The Event List stores a list of completed parity-done events with the IDs of the corresponding NVM store instruction, and the Dispatch Circuit receives NVM Store and barrier instructions and sends the NVM Store instructions to the NVM (typically without the ID) only after the corresponding parity-done event is in the Events List. In some embodiments, barrier release events may be the completion of parity calculation, the sending of the parity data (referred to as parity signature, or a parity block hereinbelow), the expiration of a timeout defined in the barrier instruction, the expiration of a global protection timeout and the receipt of a barrier-release instruction that the processor may send.

In some embodiments, the Events List includes one or more content addressable memories (CAMs), which store the ID of the completed parity events in a search field; in an embodiment the dispatch circuit send search requests with a respective ID to the events list, and the event list sends the Dispatch Circuit an indication that a completion event corresponding to the request ID is found in a CAM.

Thus, in embodiments, a processor can mitigate RAID congestion by sending barrier instructions intertwined between NVM Store instructions to a dispatcher.

DESCRIPTION OF EMBODIMENTS

To mitigate congestion of a RAID that generates parity information when a NVM is programmed, a user inserts barrier instructions between NVM Store instruction. The barrier instructions separate NVM Store instructions, avoiding the cases wherein the RAID underperforms because of internal resource sharing conflicts (e.g., due to cache thrashing).

FIG. 1 is a block diagram that schematically illustrates a System 100 including a System on Silicon (SOC) 102 coupled to an NVM Subsystem 104, in accordance with an embodiment that is described herein. In embodiments, NVM subsystem 104 may include a NVM (e.g., Flash) drive, an SSD, or any other suitable non-volatile memory; for brevity, we will refer below to NVM Subsystem 104 as NVM.

SOC 102 includes a Processor 106 that initiates NVM Store instructions, a Dispatcher 108 that receives the NVM store instructions from the processor, a Lane-Control circuit 110 that receives data requests from the NVM, a Random-Access Memory (RAM) 112 that temporarily stores data to be programmed into the NVM, and a RAID 114, configured to generate parity (e.g., CRC or ECC) information pertaining to blocks of data that are programmed in the NVM. We will refer to the parity information associated with a block of data (e.g., CRC, ECC and others) as the parity signature of the block.

It should be noted that FIG. 1 illustrates only the circuitry of SOC 102 that takes part in the storing of data in the NVM; other circuits are not shown and/or described. For example, circuits and paths to read data and/or to erase sectors of the NVM are not shown, as well as circuitry that is unrelated to the NVM.

Processor 106 may include more than one processor, for example, a server processor that runs Flash Translation Layer (FTL), and a client processor that sends NVM store and read instructions. The two processors (and any other processors which may be involved in the communication with the NVM) will be collectively referred to as Processor 106.

Typically, to store a block of data in the NVM, processor 106 sends one or more NVM Store instructions to Dispatcher 108, which forwards a corresponding store instruction to the NVM. In embodiments, each NVM-Store instruction has a unique ID code, e.g., a serial number.

Responsively to receiving the NVM Store instruction, the NVM requests from Lane Control Circuit 110 to fetch the data to be stored. The Lane Control circuit reads the requested data from RAM 112, and sends the data, concurrently, to NVM 104 and to RAID 114. The RAID calculates a parity signature of the data to be stored in the NVM and, when completed, sends the parity signature to the NVM.

Processor 106 typically sends multiple NVM-store instructions, and the RAID may compute parity signatures of multiple data blocks concurrently. As the internal parity calculation resources of the RAID (including, for example, an internal cache memory) are limited, handling of multiple parity calculations concurrently may sometimes result in overloading of the RAID and subsequent performance degradation (e.g., cache thrashing).

According to the example embodiment illustrated in FIG. 1 and described herein, such performance degradation may be mitigated. Processor 106 is configured to send barrier instructions between pairs of NVM store instructions which, if executed continually, may overload the RAID. The Dispatcher receives such barrier instructions and, responsively, delays sending further NVM store instructions until the RAID indicates Parity-Completion (as will be described below, at least two types of parity completion indications may be used).

Thus, according to the example embodiment illustrated in FIG. 1 and described hereinabove, RAID congestion, including cache thrashing may be mitigated by separating store instructions that may lead to such congestion; the store instructions are separated by barrier instructions that the dispatcher receives and, responsively, delays further store instructions.

The configuration of system 100 and SOC 102 illustrated in FIG. 1 and described hereinabove is cited by way of example. Other configurations may be used in alternative embodiments. For example, in an embodiment, the RAID is configured to fetch the store data from RAM 112 and send the data and the parity signature to the NVM (and, hence, Lane Control circuit 110 is not required).

Figure 2:
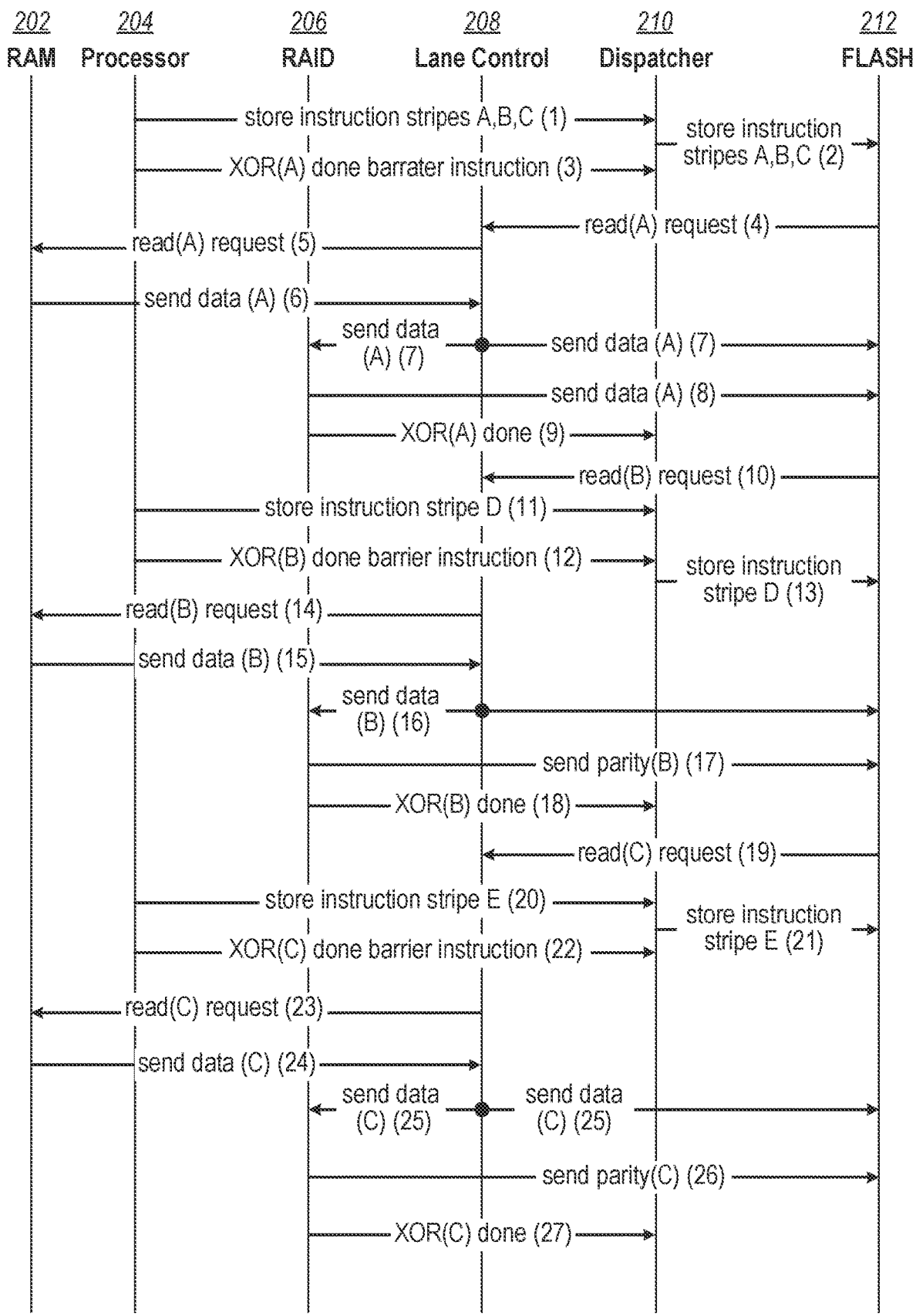
FIG. 2 is a diagram that schematically illustrates a request-response flow, in accordance with an embodiment that is described herein.

FIG. 2 is a diagram that schematically illustrates a request-response flow 200, in accordance with an embodiment that is described herein. The blocks of data that are written in the NVM are referred to as Stripes, and the RAID generates a separate parity signature for each stripe.

Flow 200 describes message and data transfers for writing data stripes in the NVM, between a RAM 202, a Processor 204, a RAID 208, a Lane-Control circuit 208, a Dispatcher 210 and a NVM (in the present example Flash) 212. In embodiments, message and data transfers are done between interface and drivers of the corresponding circuits; for example, transactions with the RAM are typically done through a DRAM-driver circuit; and transactions with the NVM are done through a Peripheral Component Interconnect (PCIe) interface that is coupled to the NM.

We will describe the flow as an ordered list of operations; each operation is a transaction of data (including requests for data, XOR signatures, stripe data and indication) between a sender and a recipient (or sometimes two recipients). The operations are done in order, but in some cases the order is flexible, as will be explained below.

1. Processor 204 sends to the Dispatcher an instruction to store three stripes of data (A, B and C) in the NVM. The Dispatcher queues the instruction.
2. The Dispatcher forwards a corresponding store instruction to the NVM.
3. The Processor sends a barrier instruction which directs the Dispatcher to delay further NVM store instructions until the RAID indicates that the calculation of stripe A parity signature has completed.
4. To execute the Store-stripe-A instruction, the NVM requests stripe-A data.
5. Responsively, the Lane Control circuit requests to read stripe A data from the RAM (it is assumed that the data to be stored has been preloaded in the RAM, e.g., by the processor).
6. The RAM sends the requested data to the Lane Control circuit.
7. The Lane Control circuit sends stripe A data in parallel to both the RAID (for parity calculation) and to the NVM (for storing).
8. When the RAID completes the calculation of stripe A parity signature, the RAID sends the parity signature of stripe A to the NVM.
9. The RAID sends a stripe A parity completion indication to the Dispatcher. (The RAID may alternatively send a parity calculation done indication prior or in parallel to operation 8, according to the type of barrier instruction.)

10. The NVM requests from the Lane Control circuit to fetch stripe B data.
11. The Processor sends to the Dispatcher an instruction to store a single stripe D.
12. The Processor sends a barrier instruction directing the Dispatcher to wait for stripe-B parity completion prior to storing any more stripes.
13. Responsively to the Store instruction of operation 11, the Dispatcher sends a Store instruction to store stripe D.
14. Responsively to the read request of operation 10, the Lane Control circuit now sends a request to the RAM, to retrieve stripe B data.
15. The RAM sends stripe B data to the Lane Control circuit.
16. The Lane Control circuit sends stripe B data in parallel to both the RAID (for parity calculation) and to the NVM (for storing).
17. The RAID sends stripe B parity signature to the NVM
18. The RAID sends stripe B parity completion indication to the Dispatcher.
19. The NVM requests from the Lane Control circuit to fetch stripe C data.
20. The Processor sends to the Dispatcher an instruction to store a single stripe E.
21. Responsively to the store instruction of operation 20, the Dispatcher sends a store instruction to store stripe E.
22. The Processor sends a barrier instruction directing the Dispatcher to wait for stripe-C parity completion prior to storing any more stripes.
23. Responsively to the read request of operation 19, the Lane Control circuit now sends a request to the RAM, to retrieve stripe C data.
24. The RAM sends stripe C data to the Lane Control circuit.
25. The Lane Control circuit sends stripe C data in parallel to both the RAID (for parity calculation) and to the NVM (for storing).
26. The RAID sends stripe C parity signature to the NVM
27. The RAID sends stripe C parity completion indication to the Dispatcher.

The flow of transactions continues after operation 27, with the storing of stripes D and E and any further stripes that the processor may request to store.

Ordering

It should be noted that the order of operations illustrated in FIG. 2 and described hereinabove is an example. As various transactions are asynchronous to each other, some operations may be done concurrently, fully or partially overlapping. Moreover, in some cases the order may change. For example, the RAID may send XOR-DONE indication at the same time or after sending the parity signature to the NVM, and, for another example, data for different stripes may be sent in parallel.

However, barrier instructions that the processor sends to the dispatcher must be sent between two store instructions that are to be separated. And, of course, responses to requests always follow the corresponding requests.

Types of Barrier Instructions

In some embodiments, barrier instruction may specify four types of barrier-release events:
1. Parity-calculation-done event—the calculation of the parity signature of a specified NVM-Store instruction has completed.
2. Parity-I/O done event—the sending of the parity signature (by the RAID) has completed.
3. Time-out event—the time since the Dispatcher has sent the last NVM-Store instruction exceeds a specified limit.
4. Software release (also referred to as FW release)—the processor sends a barrier release instruction.

In addition, in some embodiments, to protect from deadlocks, a protection timer is used. The protection timer will generate a barrier release event if the time since the Dispatcher has sent the last NVM-Store instruction exceeds a specified limit (this timer will always be active, whereas the time-out event timer will be active responsively to a time-out barrier instruction).

Figure 3:
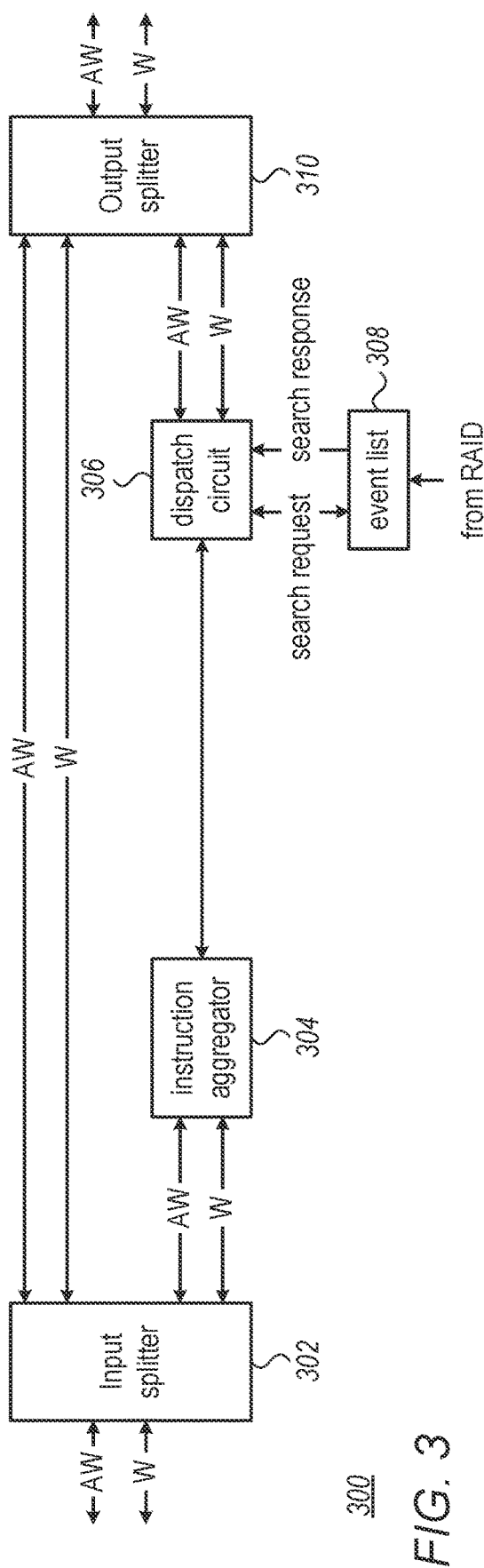
FIG. 3 is a block diagram that schematically illustrates a Dispatcher, in accordance with an embodiment that is described herein.

FIG. 3 is a block diagram that schematically illustrates a Dispatcher 300, in accordance with an embodiment that is described herein. In some embodiments, the input/output busses (except for the connection to the RAID), as well as the internal busses within the Dispatcher comply with ARM Advanced extensible Interface (AXI) specifications and include at least an Address-Write (AW) channel, and a Write (W) channel; in embodiments, other channels such as Write-Response (B), Address-Read (AR) and Read (R) may also be used.

Dispatcher 300 includes an Input Splitter 302, an Instruction Aggregator 304, a Dispatch Circuit 306, an Event List 308, and an Output Merger 310.

The Dispatcher receives NVM and barrier instructions from Processor 106 (FIG. 1) over an AW channel that carries an address, and a W channel for the write data. Input Splitter 302 decodes the instructions, sends the NVM-store and the barrier instructions (including barrier-release instructions) to the Input Aggregator, and sends all other instructions directly to Output Merger 310.

Input Aggregator 304 aggregates consecutive NVM store instructions, for better efficiency. In an embodiment, the Input Aggregator is configured to aggregate a preset number of NVM-store instructions; in some embodiments, the Input Aggregator is configured to time-out the aggregation, and immediately send the instructions that were aggregated a preset time after receiving the first aggregated instruction.

Dispatch Circuit 308, (which will be described below, with reference to FIGS. 4 and 5) receives NVM-store and barrier (including barrier-release) instructions from the Input Aggregator and sends NVM store instructions downstream (to the Output Merger). The Dispatch Circuit separates NVM store instructions according to the barrier instructions that the Dispatch Circuit receives.

Event List 308, (which will be described below, with reference to FIG. 6) stores parity completion events that the RAID sends. The Dispatch Circuit requests the Event List to search for completion events (specified by the barrier instructions); the Event List searches for the events and returns a found/not-found indication.

Output Merger 310 is configured to received NVM instruction from the input splitter and from the dispatch circuit, aggregate the instructions (when needed) and send the instructions, typically through a PCIe interface, to the NVM.

Figure 4:
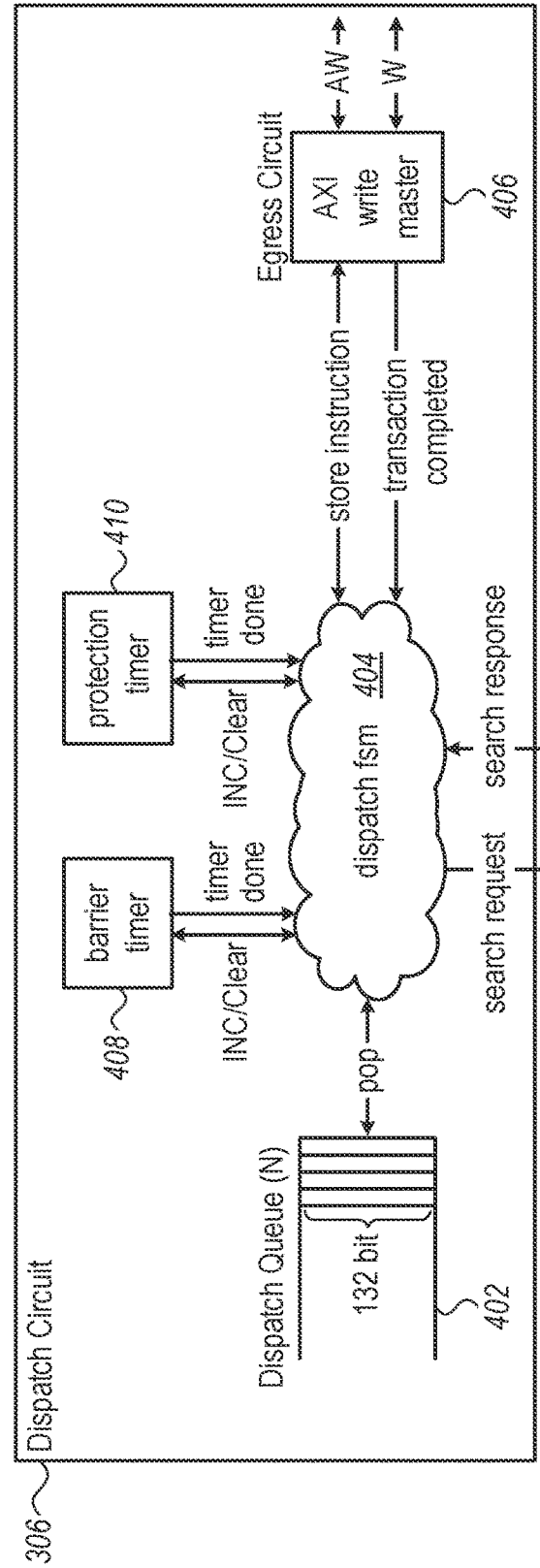
FIG. 4 is a block diagram that schematically illustrates a Dispatch Circuit, in accordance with an embodiment that is described herein.

FIG. 4 is a block diagram that schematically illustrates a Dispatch Circuit 306, in accordance with an embodiment that is described herein. The Dispatch Circuit includes a Dispatch Queue 402 to buffer ingress NVM instructions, a Dispatch Finite-State-Machine (FSM) 404 to control the dispatch circuit operation, and an Egress Circuit 406 (including AXI AW and AXI W channels), to send memory store instructions to Output Merger 310 (FIG. 3).

The Dispatch-FSM pops NVM and barrier instructions from the top of the Dispatch Queue, and sends the NVM instructions to the Egress Circuit, separating NVM instructions with interleaved barrier instructions according to rules specified by the barrier instructions.

The Dispatch FSM sends search requests to Event-List 308 (FIG. 3), to search for a parity completion event, as specified by the barrier instruction, and receives a corresponding search response, indicating whether the specified parity completion event was found (in embodiments, the Event List will indicate Event-Found only; responsively to a search request, the Event List will continually search for the event until the event is found, and then issue an event found indication; thus, the FSM will not have to reissue the search request when a corresponding parity event is not found).

Dispatch circuit 306 further includes a Barrier Timer 408, and a Protection timer 410. If the barrier instruction is a barrier timeout instruction that specifies a minimum time gap between NVM-store instructions, the Dispatch FSM initializes the Barrier-Timer to count the specified time period, and the Barrier-Timer indicates to the Dispatch FSM when the time period expires. Additionally, to prevent deadlocks, the Dispatch FSM initializes the Protection Timer whenever the Dispatch FSM sends a NVM-Store instruction, and the Protection Timer indicates if no NVM-Store instructions were sent in a period that exceeds a preset maximum (assuming Dispatch Queue 402 is not empty).

Figure 5:
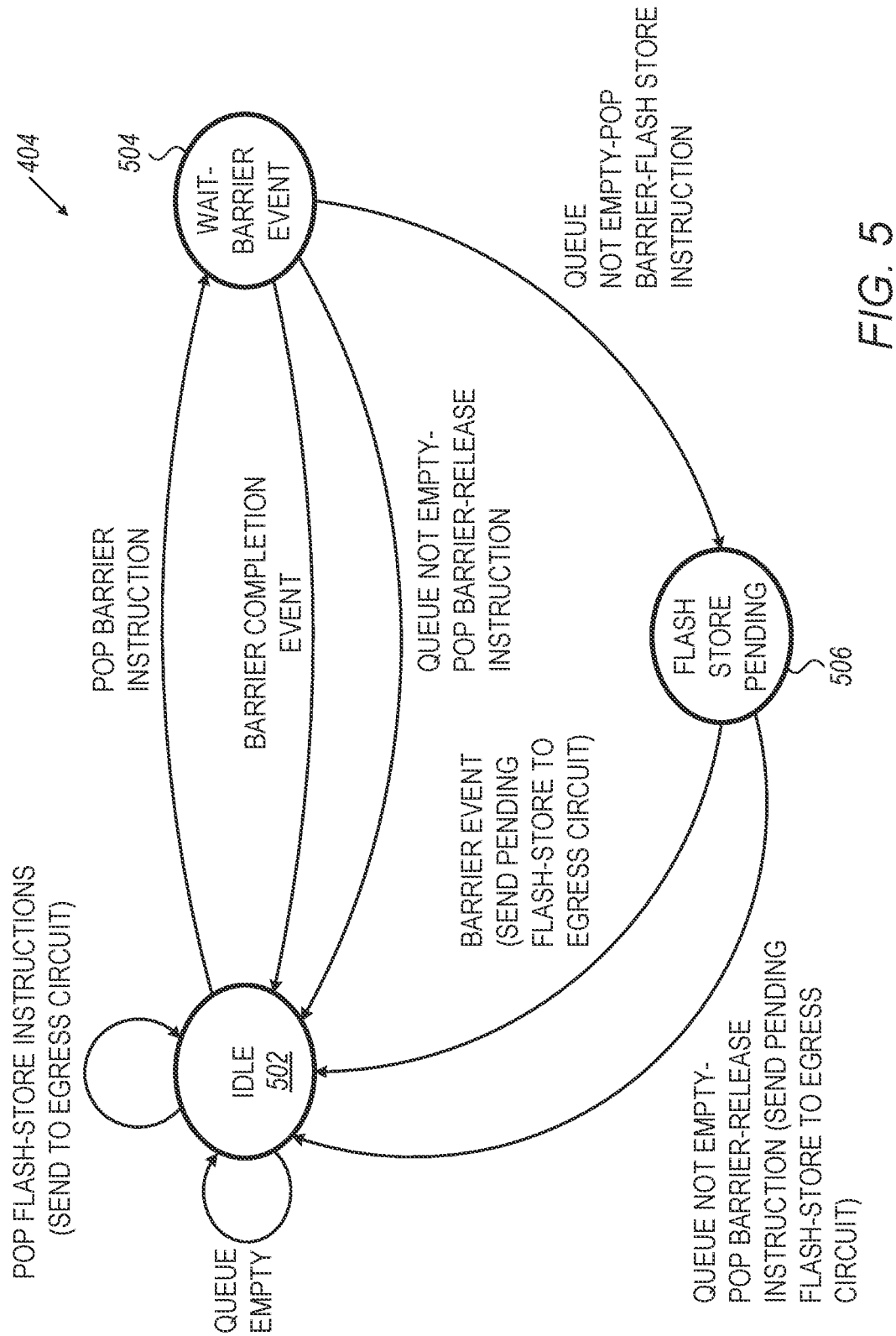
FIG. 5 is a diagram that schematically describes a dispatcher Finite-State-Machine (FSM), in accordance with an embodiment that is described herein.

FIG. 5 is a diagram that schematically illustrates a dispatcher Finite-State-Machine (FSM) 404, in accordance with an embodiment that is described herein. The FSM includes an Idle state 502, a Wait-Barrier-Event state 504, and a Flash-Store state 506. (FSM 404 is simplified and does not include handling of error conditions, expiration of the protection timer, and others.)

Upon initialization, and while Dispatch Queue 402 (FIG. 4) is empty, the FSM is in the IDLE state. When the queue is not empty, the FSM pops the instruction at the top of the queue (oldest entry). If the popped instruction is Store-Flash, the FSM will send the instruction to Egress Circuit 406 (FIG. 4) and remain in the IDLE state. If the FSM is in the Idle state and the popped instruction is a barrier instruction, the FSM will enter the Wait-Barrier-Event state.

While in the Wait-Barrier state, the FSM will, according to the type of barrier instruction, either: (i) request Events-List 308 (FIG. 3) to search for a corresponding barrier completion event; or (ii) start barrier timer 408 (FIG. 3) to the time limit specified in the barrier instruction. Either a Search-Found indication from the Event List or a timer-done indication from the Barrier Timer will be considered a Barrier-Completion event and cause the FSM to re-enter Idle state and thus, allow sending of further NVM-Store instructions to the Egress Circuit.

If, while in Wait-Barrier-Event state 504, Dispatch Queue 403 (FIG. 4) ceases to be empty, the FSM pops the instruction at the top of the queue. According to the example embodiment illustrated in FIG. 5, the popped instruction is either a barrier-release instruction or a NVM Store instruction (since Input Splitter 302 (FIG. 3) sends only NVM-Store, Barrier instructions and barrier-release instructions to Dispatch Queue 402, and since two consecutive barrier instructions are not allowed).

If the popped instruction is a barrier release instruction, the FSM will enter the IDLE state. If the popped instruction is a NVM Store instruction, the FSM will save the FSM-Store instruction, and enter the Flash-Store Pending state.

If, when the FSM is in the Flash-Store-Pending state, the FSM receives a Barrier-Completion event, or if the queue ceases to be empty and the FSM pops a barrier release instruction from the Dispatch Queue, the FSM will send the saved Store-FSM instruction to the Egress Circuit, and re-enter Idle state.

Thus, according to the example FSM illustrated in FIG. 5 and described hereinabove, the FSM will send ingress Store-NVM instructions to the Egress circuit, inserting gaps in accordance to intertwined barrier instructions.

Figure 6:
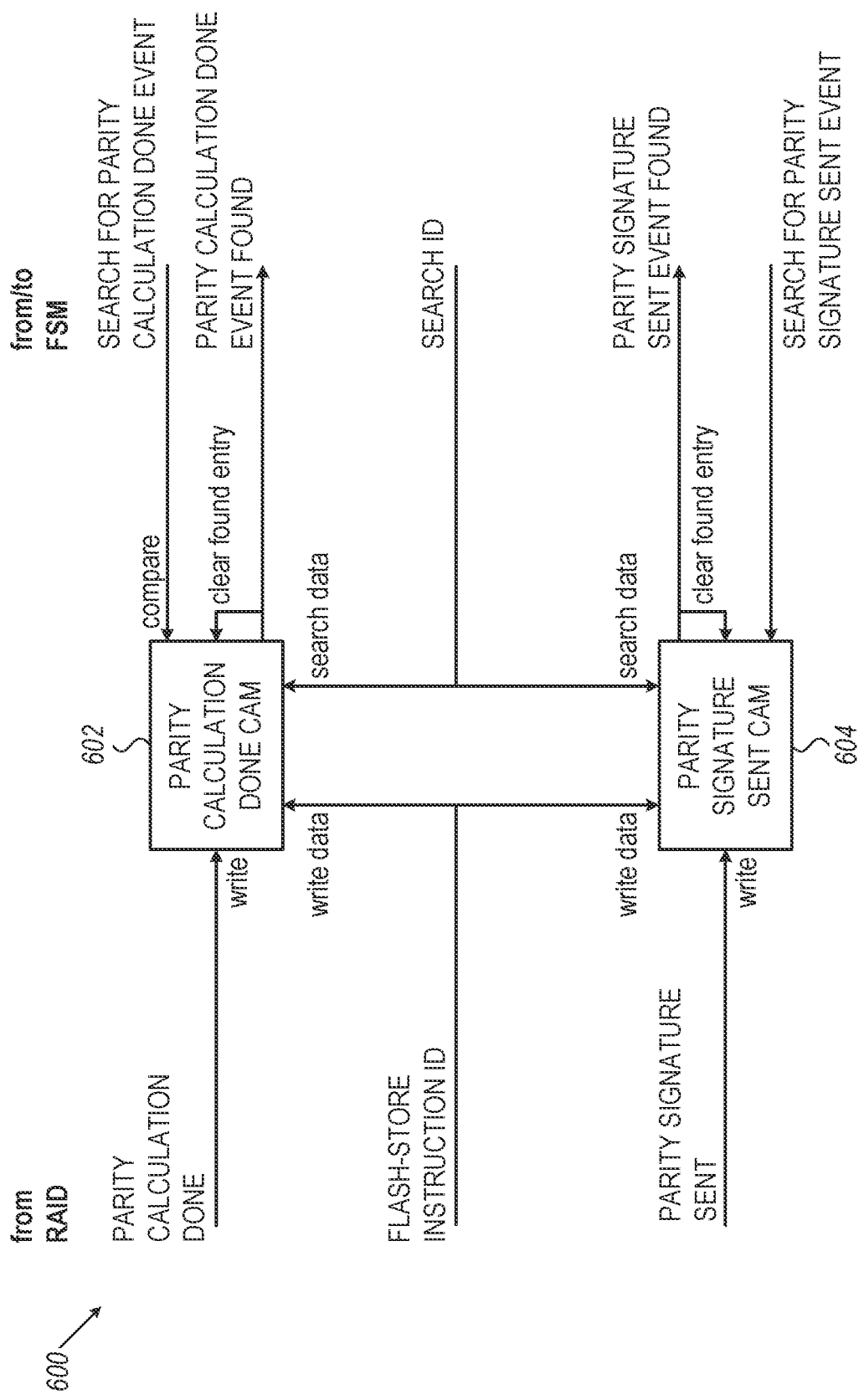
FIG. 6 is a block diagram that schematically illustrates an Event List, in accordance with an embodiment that is described herein.

FIG. 6 is a block diagram that schematically illustrates an Event List 600, in accordance with an embodiment that is described herein. The Event List includes a Parity-Calculation-Done Content-Addressable Memory (CAM) 602, and a Parity-Signature-Sent CAM 604. Each CAM includes a search array that stores ID numbers of NVM-Store instructions corresponding to RAID completion events.

When the RAID completes a parity signature calculation, the RAID asserts the ID of the corresponding NVM-Store instruction on a NVM-Store ID bus and sends a Parity Calculation Done signal. The Parity Calculation Done signal will write the ID in a vacant search row of Parity-Calculation-Done CAM 602. Similarly, when the RAID completes sending a parity signature, the RAID asserts the corresponding NVM-Store ID on the NVM-Store ID bus and sends a Parity Signature Sent signal. The Parity Signature Sent signal will write the ID in a vacant search row of Parity-Signature-Sent CAM 604.

When Dispatch Circuit 306 (FIG. 3) requests a search for a parity-calculation done event, the dispatch circuit asserts the ID of the corresponding NVM-Store instruction on a Search-ID bus and sends a Search Parity-Calculation-Done signal, which will initiate a parallel search for the ID in CAM 602. If the ID is found, CAM 602 will send a Parity-Calculation-Done-Event signal to the dispatch circuit and clear the corresponding row in the CAM (to make room for further completion events).

Similarly, when the dispatch circuit requests a search for a parity-signature-sent event, the dispatch circuit asserts the ID of the NVM-Store instruction on the Search-ID bus and sends a Search Parity-Signature-Sent signal, which will initiate a parallel search for the ID in CAM 604. If the ID is found, CAM 604 will send a Parity-Signature-Sent-Event signal to the dispatch circuit and clear the corresponding row in the CAM.

The configuration of Dispatcher 300, including Input Splitter 302, Instruction Aggregator 304, Dispatch Circuit 306, Events List 308 and Output Merger 310, including sub-circuits thereof, illustrated in FIGS. 3 through 6 and described hereinabove are example configurations that are cited merely for the sake of conceptual clarity. Other suitable configurations may be used in alternative embodiments. For example, Input Aggregator 304 is optional and, in some embodiments, may not be needed (e.g., when the Dispatch Circuit is fast enough to handle non-aggregated NVM instructions). In embodiments, Event List 308 responds to search request when the required event is found (rather than sending a found/not found indication). In an embodiment, barrier instructions may indicate combined events (e.g., a completion event OR a time-out event), and FSM 404 changes accordingly. Lastly, in some embodiments CAM 602 and CAM 604 are merged, and the event-type (parity calculation done or parity signature sent) is an additional search bit that is concatenated with the ID field.

Figure 7:
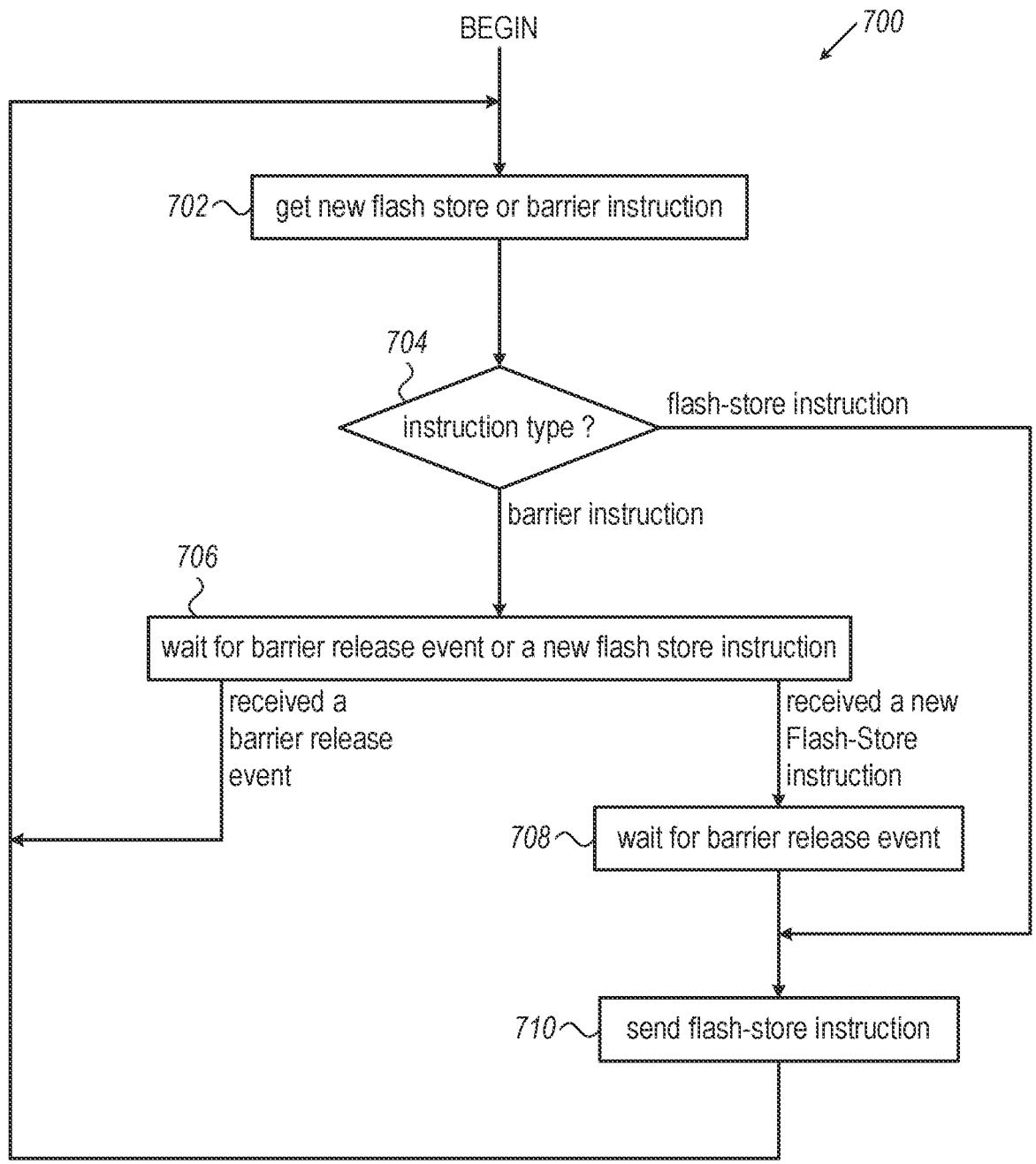
FIG. 7 is a flowchart that schematically illustrates a method for improving the performance of NVM store operations, in accordance with an embodiment that is described herein.

FIG. 7 is a flowchart that schematically illustrates a method for improving the performance of NVM store operations, in accordance with an embodiment that is described herein. The flowchart is executed by Dispatcher 108 (FIG. 1).

The flowchart starts at a Receive NVM Instruction operation 702, wherein the Dispatcher receives a new NVM instruction. In embodiment, the instruction may be sent by a processor running Flash Translation Layer (FTL) software with added barrier instructions (e.g., processor 106 (FIG. 1)). Next, the Dispatcher enters a Check-Instruction-Type operation 704 and checks the type of the received instruction.

If the instruction is a Barrier instruction, the Dispatcher enters Wait-Barrier-Release-or-NVM-Store operation 706 and waits for either a new NVM store instruction or a barrier release event (the earlier). A barrier release event, in the present context, is defined as either: (i) a parity calculation done event; (ii) a parity-signature-sent event; (iii) a barrier timeout event; (iv) receipt if a barrier-release instruction. (The first three barrier release events of the list above are determined according to the type of barrier instruction received in operation 702; the fourth barrier release event refers to a new instruction that the Dispatcher receives while in operation 706.)

The next operation is determined according to the event found in operation 706—if the found event is a new NVM-Store instruction, the Dispatcher will enter a Wait-Barrier-Release operation 708 and wait for a barrier-release; if the found event is a barrier release event, the Dispatcher will reenter operation 702 to wait for further instructions.

If the Dispatcher receives a barrier-release event (as defined hereinabove) while the Dispatcher is in operation 708, or if the received instruction in operation 704 is a NVM Store instruction, the Dispatcher enters a Send NVM-Store operation 710, sends the NVM-Store instruction, and then reenters operation 702 to wait for the next instruction.

The configuration of flowchart 700, illustrated in FIG. 7 and described hereinabove, is an example that is cited for conceptual clarity. Other configurations may be used in alternative embodiments. For example, in some embodiments, when the Dispatcher is in operation 706 or in operation 708, the Dispatcher also checks for a global-protect timeout event that is not specified in a barrier instruction.

The configuration of system 100, including SOC 102 and Dispatcher 300, Dispatch Circuit 306, FSM 404 and Event List 600, including all subunits thereof, the configuration of request-response flow 200 and the method of flowchart 700, are example configurations, request-response flows, finite-state-machines and flowcharts that are shown purely for the sake of conceptual clarity. Any other configurations, request-response flows, finite-state-machines and flowcharts can be used in alternative embodiments.

In some embodiments, processor 106 includes one or more general-purpose programmable processors, which are programmed in software to carry out the functions described herein. The software may be downloaded to the processors in electronic form, over a network, for example, or it may, alternatively or additionally, be provided and/or stored on non-transitory tangible media, such as magnetic, optical, or electronic memory.

In various embodiments, SOC 102 or subunits thereof may be implemented using suitable hardware, such as one or more Application-Specific Integrated Circuits (ASIC) or Field-Programmable Gate Arrays (FPGA), or a combination of ASIC and FPGA.

Although the embodiments described herein mainly address programming of a NVM (e.g., Flash) memory, the methods and systems described herein can also be used in other applications.

Figure 8:
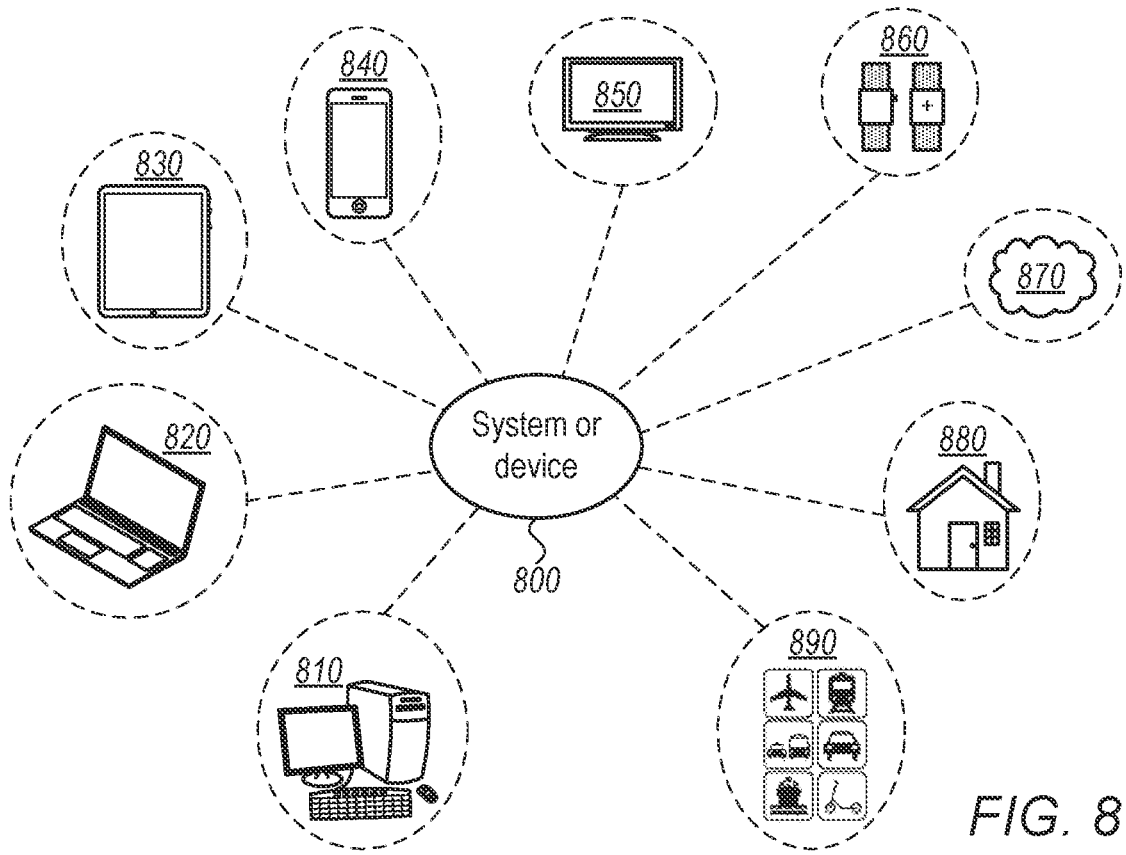
FIG. 8 is a diagram that schematically illustrates various types of systems that may include any of the circuits, devices, or system discussed above, in accordance with embodiments that are described herein.

FIG. 8 is a diagram 800 that schematically illustrates various types of systems that may include any of the circuits, devices, or system discussed above, in accordance with embodiments that are described herein. System or device 800, which may incorporate or otherwise utilize one or more of the techniques described herein, may be utilized in a wide range of areas. For example, system or device 800 may be utilized as part of the hardware of systems such as a desktop computer 810, laptop computer 820, tablet computer 830, cellular or mobile phone 840, or television 850 (or set-top box coupled to a television).

Similarly, disclosed elements may be utilized in a wearable device 860, such as a smartwatch or a health-monitoring device. Smartwatches, in many embodiments, may implement a variety of different functions, for example, access to email, cellular service, calendar, health monitoring, etc. A wearable device may also be designed solely to perform health-monitoring functions, such as monitoring a user's vital signs, performing epidemiological functions such as contact tracing, providing communication to an emergency medical service, etc. Other types of devices are also contemplated, including devices worn on the neck, devices implantable in the human body, glasses or a helmet designed to provide computer-generated reality experiences such as those based on augmented and/or virtual reality, etc.

System or device 800 may also be used in various other contexts. For example, system or device 800 may be utilized in the context of a server computer system, such as a dedicated server or on shared hardware that implements a cloud-based service 870. Still further, system or device 800 may be implemented in a wide range of specialized everyday devices, including devices 880 commonly found in the home such as refrigerators, thermostats, security cameras, etc. The interconnection of such devices is often referred to as the "Internet of Things" (IoT). Elements may also be implemented in various modes of transportation. For example, system or device 800 could be employed in the control systems, guidance systems, entertainment systems, etc. of various types of vehicles 890.

The applications illustrated in FIG. 8 are merely exemplary and are not intended to limit the potential future applications of disclosed systems or devices. Other example applications include, without limitation: portable gaming devices, music players, data storage devices, unmanned aerial vehicles, etc.

The present disclosure has described various example circuits in detail above. It is intended that the present disclosure cover not only embodiments that include such circuitry, but also a computer-readable storage medium that includes design information that specifies such circuitry. Accordingly, the present disclosure is intended to support claims that cover not only an apparatus that includes the disclosed circuitry, but also a storage medium that specifies the circuitry in a format that is recognized by a fabrication system configured to produce hardware (e.g., an integrated circuit) that includes the disclosed circuitry. Claims to such a storage medium are intended to cover, for example, an entity that produces a circuit design, but does not itself fabricate the design.

Figure 9:
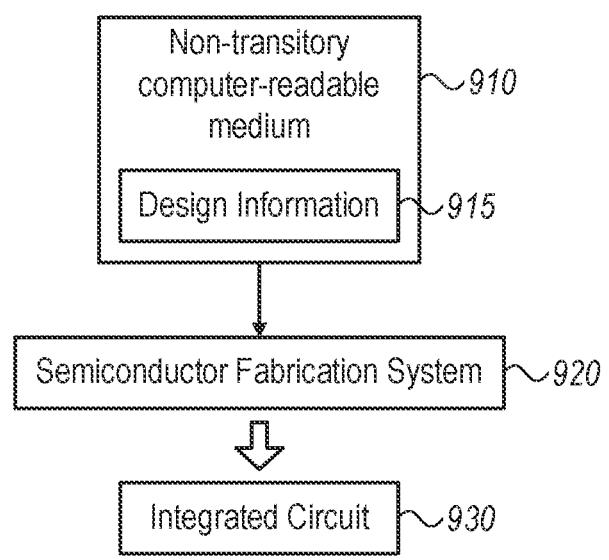
FIG. 9 is a block diagram illustrating an example non-transitory computer-readable storage medium that stores circuit design information, in accordance to some embodiments.

FIG. 9 is a block diagram illustrating an example non-transitory computer-readable storage medium that stores circuit design information, according to some embodiments. In the illustrated embodiment semiconductor fabrication system 920 is configured to process the design information 915 stored on non-transitory computer-readable medium 910 and fabricate integrated circuit 930 based on the design information 915.

Non-transitory computer-readable storage medium 910, may include any of various appropriate types of memory devices or storage devices. Non-transitory computer-readable storage medium 910 may be an installation medium, e.g., a CD-ROM, floppy disks, or tape device; a computer system memory or random-access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Non-transitory computer-readable storage medium 910 may include other types of non-transitory memory as well or combinations thereof. Non-transitory computer-readable storage medium 910 may include two or more memory mediums which may reside in different locations, e.g., in different computer systems that are connected over a network.

Design information 915 may be specified using any of various appropriate computer languages, including hardware description languages such as, without limitation: VHDL, Verilog, SystemC, SystemVerilog, RHDL, M, MyHDL, etc. Design information 915 may be usable by semiconductor fabrication system 920 to fabricate at least a portion of integrated circuit 930. The format of design information 915 may be recognized by at least one semiconductor fabrication system 920. In some embodiments, design information 915 may also include one or more cell libraries which specify the synthesis, layout, or both of integrated circuit 930. In some embodiments, the design information is specified in whole or in part in the form of a netlist that specifies cell library elements and their connectivity. Design information 915, taken alone, may or may not include sufficient information for fabrication of a corresponding integrated circuit. For example, design information 915 may specify the circuit elements to be fabricated but not their physical layout. In this case, design information 915 may need to be combined with layout information to actually fabricate the specified circuitry.

Integrated circuit 930 may, in various embodiments, include one or more custom macrocells, such as memories, analog or mixed-signal circuits, and the like. In such cases, design information 915 may include information related to included macrocells. Such information may include, without limitation, schematics capture database, mask design data, behavioral models, and device or transistor level netlists. As used herein, mask design data may be formatted according to graphic data system (GDSII), or any other suitable format.

Semiconductor fabrication system 920 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 920 may also be configured to perform various testing of fabricated circuits for correct operation.

In various embodiments, integrated circuit 930 is configured to operate according to a circuit design specified by design information 915, which may include performing any of the functionality described herein. For example, integrated circuit 930 may include any of various elements shown in FIGS. 1, 2, 4, 5 and 7. Further, integrated circuit 930 may be configured to perform various functions described herein in conjunction with other components. Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components.

The present disclosure includes references to "an embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements defined by the functions or operations that they are configured to implement. The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g., passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

The invention claimed is:

1. A System on Chip (SoC), comprising:
   a processor, configured to produce store instructions for storing data blocks in a Non-Volatile-Memory (NVM);
   a parity generation circuit, configured to calculate parity blocks over the data blocks in accordance with a redundant storage scheme, to send the parity blocks to the NVM, and to produce completion notifications with respect to the parity blocks; and
   a dispatcher circuit, configured to dispatch the store instructions to the NVM,
   wherein the processor is further configured to send a parity-barrier instruction specifying a synchronization barrier over a data block and a parity block of a given store instruction, and wherein, in accordance with the parity-barrier instruction, the dispatcher circuit is configured to send the data block of the given store instruction to the NVM only after receiving a completion notification corresponding to the parity block of the given store instruction.

2. The SoC according to claim 1, wherein:
   the parity-barrier instruction is a parity-calculation-completed barrier instruction for the data block;
   the completion notification is a parity-calculation-completed completion notification, which indicates that calculation of the parity block associated with the data block is completed; and
   the dispatcher circuit is configured to send the data block to the NVM only after receiving the parity-calculation-completed completion notification.

3. The SoC according to claim 1, wherein:
the parity-barrier instruction is a parity-sending-completed barrier instruction for the data block;
the completion notification is a parity-sending-completed completion notification, which indicates that both calculation and sending of the parity block associated with the data block are completed; and
the dispatcher circuit is configured to send the data block to the NVM only after receiving the parity-sending-completed completion notification.

4. The SoC according to claim 1, wherein:
the parity-barrier instruction is a software-release-barrier instruction for the data block; and
the dispatcher circuit is configured to send the data block to the NVM only after receiving the barrier-release instruction from the processor.

5. The SoC according to claim 1, wherein the dispatcher circuit comprises a queue for storing pending store instructions.

6. The SoC according to claim 1, further comprising a memory configured to store the data blocks and the memory blocks that are pending for storage in the NVM.

7. The SoC according to claim 6, further comprising a data routing circuit, configured to route the data blocks and the parity blocks among the memory, the parity generation circuit and the NVM.

8. A method, comprising:
producing, in a processor, store instructions for storing data blocks in a Non-Volatile-Memory (NVM);
using a parity generation circuit, calculating parity blocks over the data blocks in accordance with a redundant storage scheme, sending the parity blocks to the NVM, and producing completion notifications with respect to the parity blocks; and
using a dispatcher circuit, dispatching the store instructions to the NVM,
further comprising (i) sending from the processor a parity-barrier instruction specifying a synchronization barrier over a data block and a parity block of a given store instruction, and (ii) sending the data block of the given store instruction to the NVM only after receiving a completion notification corresponding to the parity block of the given store instruction.

9. The method according to claim 8, wherein:
the parity-barrier instruction is a parity-calculation-completed barrier instruction for the data block;
the completion notification is a parity-calculation-completed completion notification, which indicates that calculation of the parity block associated with the data block is completed; and
dispatching the store instructions comprises sending the data block to the NVM only after receiving the parity-calculation-completed completion notification.

10. The method according to claim 8, wherein:
the parity-barrier instruction is a parity-sending-completed barrier instruction for the data block;
the completion notification is a parity-sending-completed completion notification, which indicates that both calculation and sending of the parity block associated with the data block are completed; and
dispatching the store instructions comprises sending the data block to the NVM only after receiving the parity-sending-completed completion notification.

11. The method according to claim 8, wherein:
the parity-barrier instruction is a software-release-barrier instruction for the data block; and
dispatching the store instructions comprises sending the data block to the NVM only after receiving the barrier-release instruction from the processor.

12. The method according to claim 8, wherein dispatching the store instructions comprises storing pending store instructions in a queue of the dispatcher circuit.

13. The method according to claim 8, further comprising storing the data blocks, and the memory blocks that are pending for storage in the NVM, in a memory.

14. The method according to claim 13, further comprising, using a data routing circuit, routing the data blocks and the parity blocks among the memory, the parity generation circuit and the NVM.

* * * * *